United States Patent
Sanderson

(10) Patent No.: US 6,475,397 B1
(45) Date of Patent: Nov. 5, 2002

(54) METHOD AND MEANS FOR FILTER BACK FLUSHING

(75) Inventor: Tommy Sanderson, Mt. Olive, NC (US)

(73) Assignee: Mepsco, Inc., West Chicago, IL (US)

(*) Notice: Subject to any disclaimer, the term of this patent is extended or adjusted under 35 U.S.C. 154(b) by 26 days.

(21) Appl. No.: 09/722,151

(22) Filed: Nov. 27, 2000

(51) Int. Cl.7 .............................................. B01D 29/62
(52) U.S. Cl. ...................... 210/791; 210/407; 210/411; 210/412; 210/413
(58) Field of Search ................ 210/791, 407, 210/409, 410, 411, 412, 413

(56) References Cited

U.S. PATENT DOCUMENTS

| | | | |
|---|---|---|---|
| 1,199,350 A | * | 9/1916 | Collin |
| 2,338,418 A | * | 1/1944 | Forrest et al. |
| 2,918,172 A | | 12/1959 | Kinney |
| 3,074,560 A | | 1/1963 | Kinney |
| 3,365,065 A | * | 1/1968 | Varjabedian |
| 3,635,348 A | | 1/1972 | Carr |
| 4,631,126 A | | 12/1986 | Keith et al. |
| 4,632,757 A | * | 12/1986 | Rosenberg ................... 210/411 |
| 4,762,615 A | | 8/1988 | Drori |
| 4,818,402 A | | 4/1989 | Steiner et al. |
| 4,859,335 A | * | 8/1989 | Whyte ......................... 210/411 |
| 4,931,180 A | | 6/1990 | Darchambeau |
| 5,128,029 A | | 7/1992 | Herrmann |
| 5,164,079 A | * | 11/1992 | Klein .......................... 210/411 |
| 5,171,433 A | | 12/1992 | Rosenberg |
| 5,882,528 A | * | 3/1999 | Davidson .................... 210/411 |

* cited by examiner

Primary Examiner—Robert J. Popovics
(74) Attorney, Agent, or Firm—James Van Santen

(57) ABSTRACT

A back-flushing method is practiced with a back-flushing filter construction wherein a perforate filter screen providing filter openings also forms an internal chamber for receiving the effluent from a liquid stream. A filter piston is disposed in the internal chamber and operates to divide the chamber into first and second zones on opposite sides of the piston. By selectively reciprocating the piston, the effluent in the chamber is compressed and moved on both sides of the piston. Thus, the effluent back-flushes the filter openings and creates a rolling action in the liquid surrounding the filter screen on the upstream side to dislodge particulate debris accumulated on the filter screen.

4 Claims, 4 Drawing Sheets

METHOD AND MEANS FOR FILTER BACK FLUSHING

FIELD OF THE INVENTION

This invention relates generally to methods of back flushing filters and more particularly to an improved back flushing filter construction which finds particular utility when used in the meat treating industry to filter liquid formulas that are injected into poultry, beef or pork by an injection machine by means of a pump that pumps the formulas into the meat through needles with small inlet and outlets.

THE PRIOR ART

The prior art is exemplified by prior issued patents such as U.S. Pat. No. 2,918,172 issued Dec.22, 1959, U.S. Pat. No. 3,074,560 issued Jan. 22, 1963 and U.S. Pat. No. 3,635,348 issued Jan. 18, 1972. With the constructions disclosed and claimed in those prior art patents, filter baskets capable of either continuous or intermittent rotation are cleaned with a doctor blade and may be additionally cleaned by a back-flushing shoe disposed inside of the basket and arranged to eject a narrow jet of liquid through a localized section of the filter basket to back-flush the filter openings as they move by the shoe.

Other prior art in the filtering art of conceivable interest includes such patents as U.S. Pat. No. 4,631,126; 4,762,615; 4,818,402; 4,931,180; 5,128,029; and 5,171,433. For example, a cleaning nozzle may be used to apply flushing liquid to a stack of discs that loosen when rotated in an opposite direction. Other forms of back wash arms are also disclosed.

SUMMARY OF THE PRESENT INVENTION

The present invention contemplates the utilization of a large stainless steel cylindrical filter basket, or cylinder, which can be disposed in the tub or tank of a liquid stream system having a plurality of filtering stages. The cylinder walls are perforated to form an array of filter openings, which may be so small that they get stopped up with tiny pieces of meat and ingredients in the liquid formulas flowing in the liquid stream.

Within the cylinder a disc plunger, or piston, is moved in a cylinder/piston relationship to compress and move effluent collected in the cylinder to back-flush the filter openings and creating a rolling action of the liquid all around the filter basket.

The operation of the filter and its back-flushing feature is automated by placing the disk plunger or piston under the control of a motor means controlled by an automatic cycling machine, thereby to cycle the disk plunger or piston through a series of reciprocations within the cylinder alternated with a period of rest. The result is a greatly enhanced and lengthened effective life cycle for the filtering system before shut-down and clean up is necessary.

DESCRIPTION OF THE PREFERRED EMBODIMENTS

Figure 1:
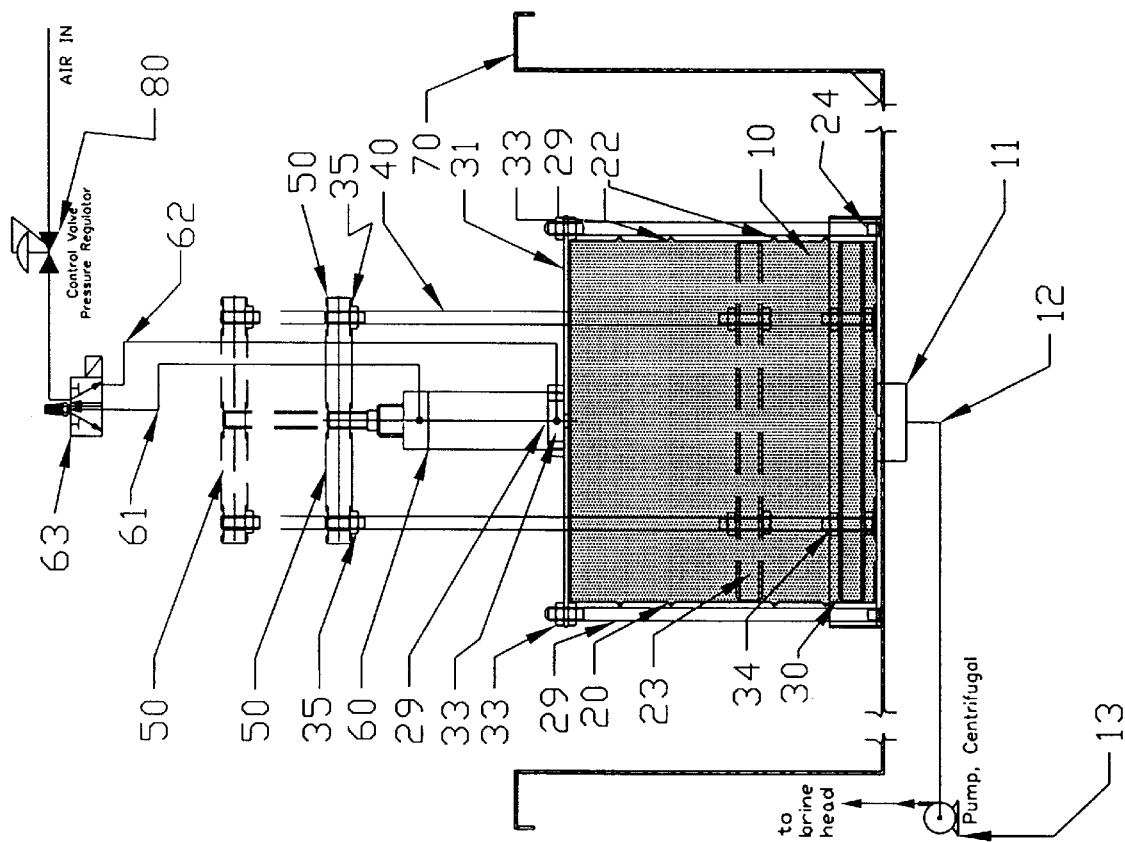
FIG. 1 is a side elevational view with parts broken away and with parts shown in cross section of a filter construction provided in accordance with the present invention and showing schematically how the filter construction is incorporated into a filtering system in order to practice the inventive methods contemplated by this invention.

Referring to FIG. 1 of the drawings, there is shown an exemplary form of a filter construction capable of practicing the methods of the present invention and connected schematically into a filtering system typical of systems used in the meat treating industry. It should be understood that the configuration of the exemplary filter illustrated for purposes of this disclosure could be changed to utilize other geometric shapes and forms without departing from the inventive features and advantages afforded by utilization of the novel concepts set forth.

Thus, in FIG. 1 there is disclosed a filter basket 10 which provides a cylinder 20 in which moves a disc plunger 30 actuated by a pair of piston rods 40 interconnected by a piston cross bar 50 so that the disc plunger, or filter piston 30 may be operated by a motor means such as an air cylinder 60.

Such a filter basket 10 is utilized with particular utility in a filtering system wherein the filter basket 10 is placed in a tank or tub 70 confining and containing part of a liquid stream in which flows liquid to be filtered, for example, liquid formula of the kind used in treating meat products, and which liquid stream has an input and an output. When incorporated in such a filtering system, the air cylinder 60 is operatively connected by conduits 61 and 62 to a source of pressurized air 63.

The filter basket 10 has an outlet 11 connected by a conduit 12 to a pump shown diagrammatically at 13 and which pump 13 pumps effluent from the filter basket 10 and directs it towards the output as shown by the arrow legend. An automatic cycling machine 80 having pre-settable control means is connected as at 81 to the source of pressurized air 63 and to the pump 13 as at 82 so that the operation of the disc plunger 30 may be selectively cycled in a selected operational pattern consisting of selectively different modes of performance, for example, the disc plunger 30 may be reciprocated within the cylinder 20 through a cycle of 4 or 5 operations and may then remain dormant, or at rest, for a pre-selected idle period of say 10–15 seconds. When so operated, the disc plunger 30 compresses and moves the effluent collected within the cylinder 20 to back-flush the liquid openings and to create a rolling action of the liquid surrounding the filter basket 10 in the tub or tank 70.

Turning now to FIGS. 2–5 of the drawings, the detailed construction of the filter 10 may be better understood. First of all, there is provided a cylinder 20 which is in effect a circumferentially continuous filter screen 21 having 4 axially spaced strengthening ribs 22 embossed to extend outwardly. The walls of the filter screen 21 are perforate, i.e., the walls are provided with an array of openings 23 through which effluent passes from outside the filter basket 10 into a chamber provided by the interior of the cylinder 20.

Figure 5:
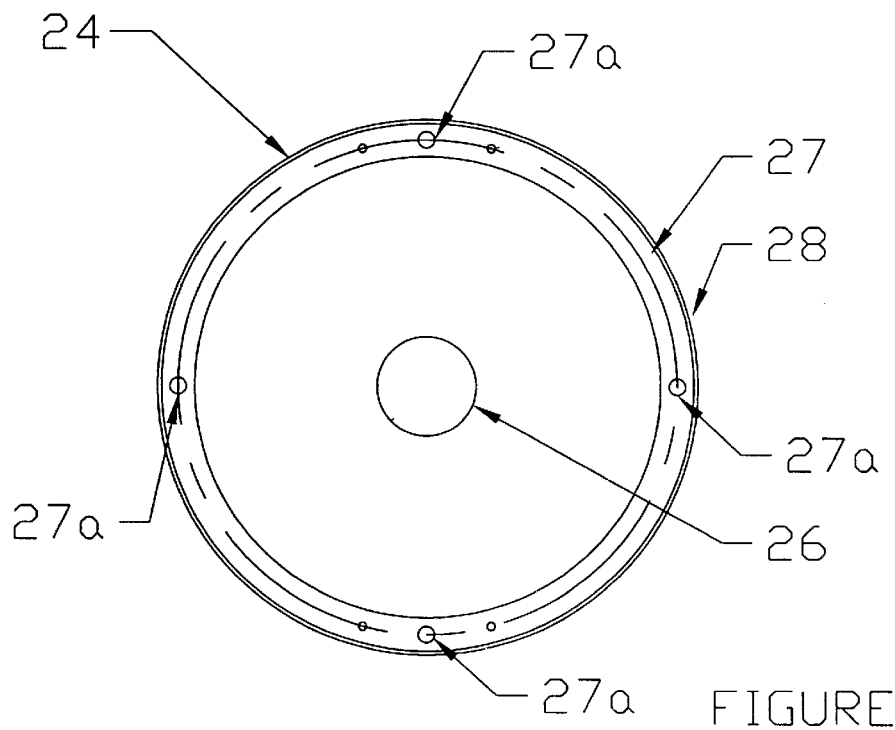
FIG. 5 is a plan elevational view of the filter base of FIG. 4.
Figure 4:
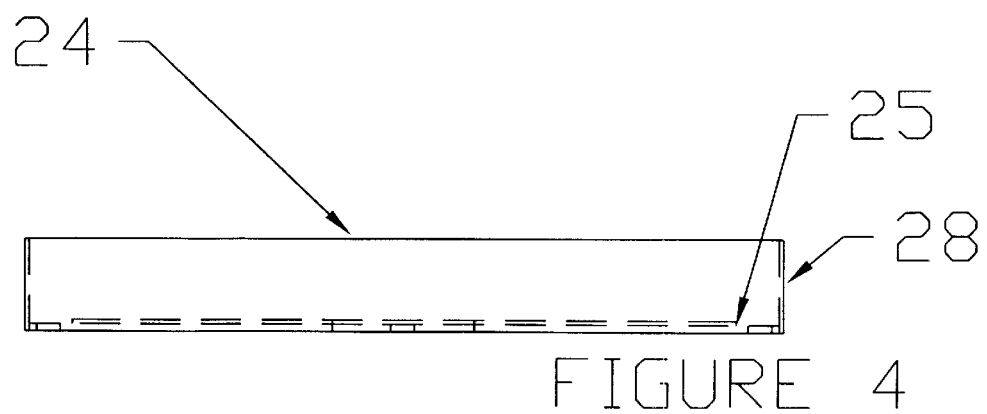
FIG. 4 is a side elevational view of the filter base of the filter construction shown in FIG. 2.

Referring to FIGS. 4 and 5, a filter base 24 receives the filter screen 21 at its lower edge on a raised circumferential seat 25. In this form of the invention, the base 24 is circular and has a centrally disposed outlet opening 26. A rim 27 extends radially outwardly from the seat 25 and terminates in an upwardly extending flange 28. The rim 27 is apertured at four equally spaced apart locations 27*a* to accommodate four tie rods each designated by a common number at 29.

In one exemplification of the invention, the filter screen 30 constitutes a 26 gauge stainless steel perforated member having filter openings 23 of 0.003 inches diameter on 0.055 center distance straight diameters, thereby providing approximately a 34% open area available for the filtering function.

The top edge of the filter screen 20 is engaged by a filter cap 31 having a rim 32 with four spaced openings 32a which likewise accommodate the tie rods 29. Thus, with the use of fastening means such as the nuts 33, the tie rods 29 clamp the filter screen 20 between the filter base 24 and the filter cap 31.

Disposed within the interior of the filter screen 20 is the disc plunger 30 sized and shaped to establish a piston/cylinder relationship with the filter screen 30. The disc plunger 30 is movable on a vertical centerline axis established by the circularly configured filter disc 20.

As previously noted, the circular configuration of the filter screen could assume a different geometric shape and the shape of the disc plunger could be correspondingly matched so that sizes and shapes other than the circular shape herein disclosed could be used without departing from the spirit of this invention.

Figure 2:
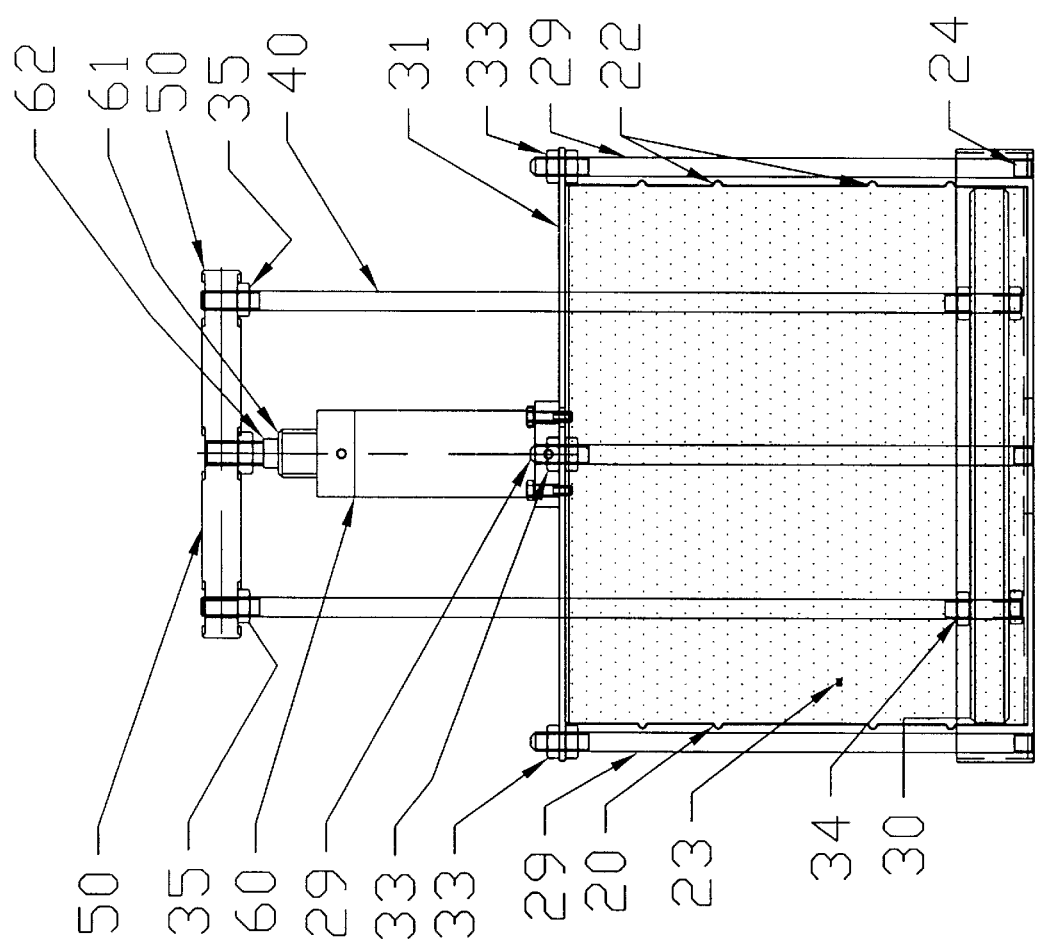
FIG. 2 is a view somewhat similar to that of FIG. 1, but showing the filter construction standing alone before installation into a tub, or tank of a filtering system.
Figure 3:
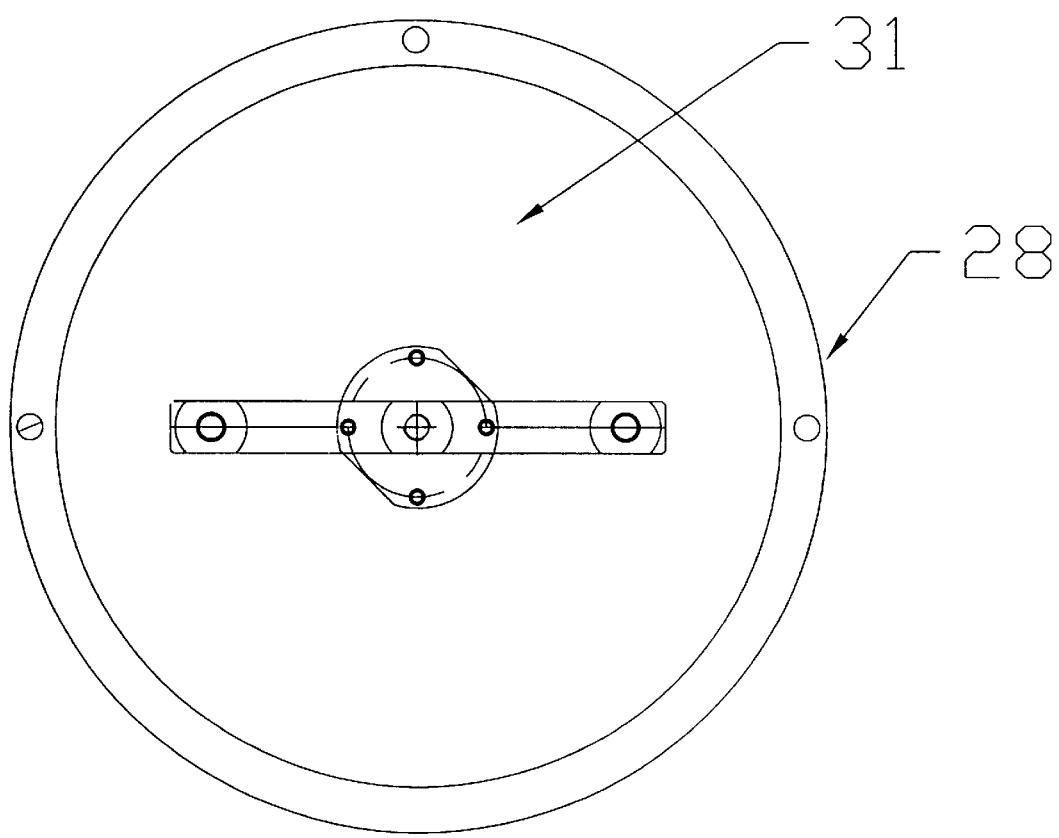
FIG. 3 is a top plan view of the filter construction of FIG. 2.

As shown in FIG. 2, the disc plunger or filter piston 30 is connected to a pair of piston rods 40,40 and secured thereto by fastening means such as the nuts 34. The piston rods 40,40 extend upwardly through the filter cap 31 and the free ends are interconnected with each other by means of a piston cross rod 50 and fastening means such as the nuts 35.

The motor means selected for providing power assistance in operating the filter piston 30 in the present exemplary disclosure is an air cylinder 60 mounted on the filter cap 31 and includes a cylinder in which moves a piston (not shown) connected to a piston rod 61 coupled to the piston cross bar 50 by means of a coupling joint 62. By supplying compressed air from the usual type of compressed air source 63, the air cylinder 60 will actuate the disc plunger 30 between the full line position and the dotted line position as shown in FIG. 1. As the disc plunger filter piston 30 is moved up and down, the liquid in the cylinder is compressed and moved to back-flush the filter openings 23 removing any materials and particles plugging the filter openings 23 and creating a rolling action of the liquid surrounding the filter basket 10.

In one exemplification of the invention, the air cylinder 60 was a two position, four way spring returned pilot operated pneumatic valve electronically controlled in a selective working pattern by an automatic cycling machine 80 taking the form of a GT3D multi-function timer in line with a pattern selector timer logic controller.

In use the filter construction is particularly effective when placed in a liquid stream flowing in a tub or tank. By pre-setting the automatic control machine 80 to regulate the air cylinder 60 via the air pressure supply 63, and in coordination with control of the pump 13, the disc plunger 30 will be reciprocated up and down in the cylinder 30, thereby to compress and move the effluent collected in the cylinder to back-flush the filter openings 23 and create a swirling, rolling action in the liquid outside of the filter basket 10. Dislodging the materials and the particles plugging the filter openings will permit the filter basket 10 to operate efficiently for a much longer time without necessitating full shut-down of the filter stream for extensive system cleaning.

While a vertical stainless steel cylinder has been illustrated, the principles of the present invention could also be practiced if the filter and its plunger were disposed on a horizontal axis, or if the filter basket and its plunger were square or rectangular.

Although minor modifications might be suggested by those artisans skilled in the art, it should be understood that I wish to embody within the scope of the patent warranted hereon all such modifications as reasonably and properly come within the scope of my contribution to the art.

I claim:

1. A method of filtering a liquid meat treating stream having a plurality of filtering stages to remove particulate meat debris from the stream which includes the steps of:

(1) flowing a supply of liquid to be filtered in the form of a stream between an input to the stream and an output from the stream, (2) at a first point in the stream confining the stream within a tank at a selected stage between the input and the output and interposing a filter screen to form a filter chamber in the stream within the tank having plural filter openings in its walls through which filtered effluent from the stream passes into the filter chamber, (3) at a second point in the stream downstream of said first point collecting and flowing the effluent from the filter chamber out of the tank, (4) at said second point in the stream within said chamber providing and cyclically moving a disc plunger dividing the chamber to compress and move effluent in said chamber on both sides of said disc plunger to back-flush the filter openings and to create a rolling action of the liquid on the upstream side of the plural filter openings thereby to dislodge particulate meat debris from the filter screen, (5) and, at a third point in the stream pumping the effluent from the chamber downstream towards a subsequent stage and the output from the stream.

2. A method as defined in claim 1 and (6) coordinating the pumping action of clause (5) with the compression and moving action of clause (4) to enhance the back flushing action.

3. A method as defined in claim 2 and (7) automatically cycling the disc plunger action of clause (4) through an operational pattern of alternate reciprocation and rest modes.

4. A filter construction adapted to be interposed in a liquid stream flowing through the confines of a tub, comprising:

(a) a filter screen comprising a circumferentially continuous cylinder disposed on a vertical axis and having a perforate wall forming an array of filter openings through which a liquid stream in the form of effluent may flow while separating debris and particulate matter in the upstream portion of the liquid stream, (b) a filter base, (c) a filter cap, (d) a plurality of tie rods interconnecting said filter base and said filter cap and clamping said filter screen there between to form a filter basket, (e) said filter base having discharge means including a discharge opening through which effluent is directed downstream of the liquid stream, (f) a filter piston in said cylinder and movable on said vertical axis, (ff) said filter piston partitioning said cylinder to form upper and lower chambers in said cylinder and operating upon movement of said piston to compress and move the effluent in said cylinder on both sides of said piston to back-flush said filter openings and to create a rolling action of the liquid on the upstream side of said perforate wall to dislodge debris and particulate matter from the filter openings, (g) a pair of piston rods each connected at one end to said filter piston and extending upwardly and outwardly through said filter cap, (h) a piston-cross bar connected to each of said piston rods at the other end thereof, (i) an air cylinder mounted on said filter cap having a air cylinder piston connected to said piston cross bar, whereby said filter piston may be driven with power assistance by said air cylinder, (j) and, automatic cycling means for regulating the operation of said air cylinder in a selected operation pattern.

* * * * *